April 3, 1945.  P. A. SOSNOSKIE  2,372,858
ELECTRIC SHOCK PREVENTOR
Filed May 12, 1942   2 Sheets-Sheet 1

Peter A. Sosnoskie INVENTOR.

BY
Victor J. Evans & Co.
ATTORNEYS

April 3, 1945.　　　P. A. SOSNOSKIE　　　2,372,858
ELECTRIC SHOCK PREVENTOR

Filed May 12, 1942　　　2 Sheets-Sheet 2

Peter A. Sosnoskie INVENTOR.

BY
*Victor J. Evans & Co.*

ATTORNEYS

Patented Apr. 3, 1945

2,372,858

UNITED STATES PATENT OFFICE 2,372,858

ELECTRIC SHOCK PREVENTER

Peter A. Sosnoskie, Shamokin, Pa., assignor of thirty-five one-hundredths to John L. Pipa, Jr., Shamokin, Pa.

Application May 12, 1942, Serial No. 442,672

10 Claims. (Cl. 175—294)

My invention relates to electric circuits, and has among its objects and advantages the provision of an improved safety circuit.

An object of my invention is to provide a safety circuit designed to prevent death or personal injury by electrocution and to protect buildings and other property from fire and damage caused through short circuiting because of defective electric wiring.

A further object is to provide a safety circuit which decreases the danger of insulation breakdown and which operates to increase the insulation between wires due to the fact that it operates on a permanent non-ground system. My system reduces the cost of electrical burn-outs for the reason that if a line becomes accidentally grounded, the ground will be immediately detected and simultaneously open a circuit or a fuse on the line which is so accidentally grounded.

The system operates on either high or low voltage and on alternating or direct current. The system will also operate on a single phase, two phase or three phase generator lines. The system eliminates the cost incident to running grounding systems on the lines, and a live electrical line operated with my system is in less danger of attracting lightning.

Figure 1:
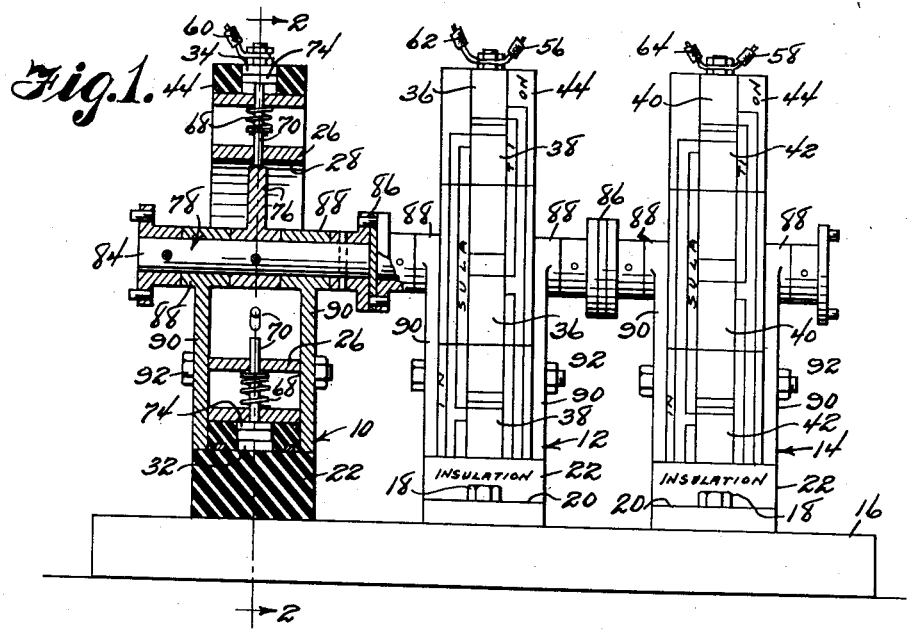
Figure 1 is a side view of a rotary contact device with one unit thereof illustrated in section.

In the embodiment selected for illustration, Figure 1 illustrates three identical units 10, 12 and 14. These units are secured to a supporting base 16 through the medium of bolts 18 passing through openings in flanges 20 of insulative bodies 22 to which the respective units are secured by bolts 24.

Figure 2:
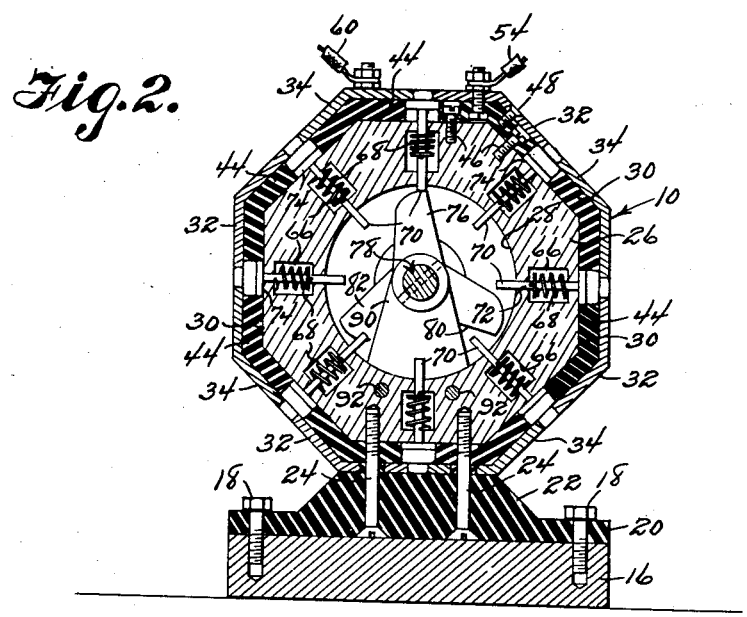
Figure 2 is a sectional view taken along the line 2—2 of Figure 1 looking in the direction indicated by the arrows.

Referring to Figure 2, the unit 10 comprises a body 26 provided with a central bore 28 and eight flat peripheral faces 30. To the body 26 are secured four copper bars 32 arranged in spaced relationship. A similar number of copper bars 34 are alternately arranged between the bars 32. In the unit 12, the bars 36 and 38 respectively correspond to the bars 32 and 34, while in unit 14 the bars are correspondingly numbered 40 and 42, see Figure 3.

In Figure 2, the bars 32 and 34 are insulated from the body 26 by blocks 44. These blocks are secured to the body 26 by screws 46 and the bars are secured to the insulating blocks by screws 48.

Figure 3:
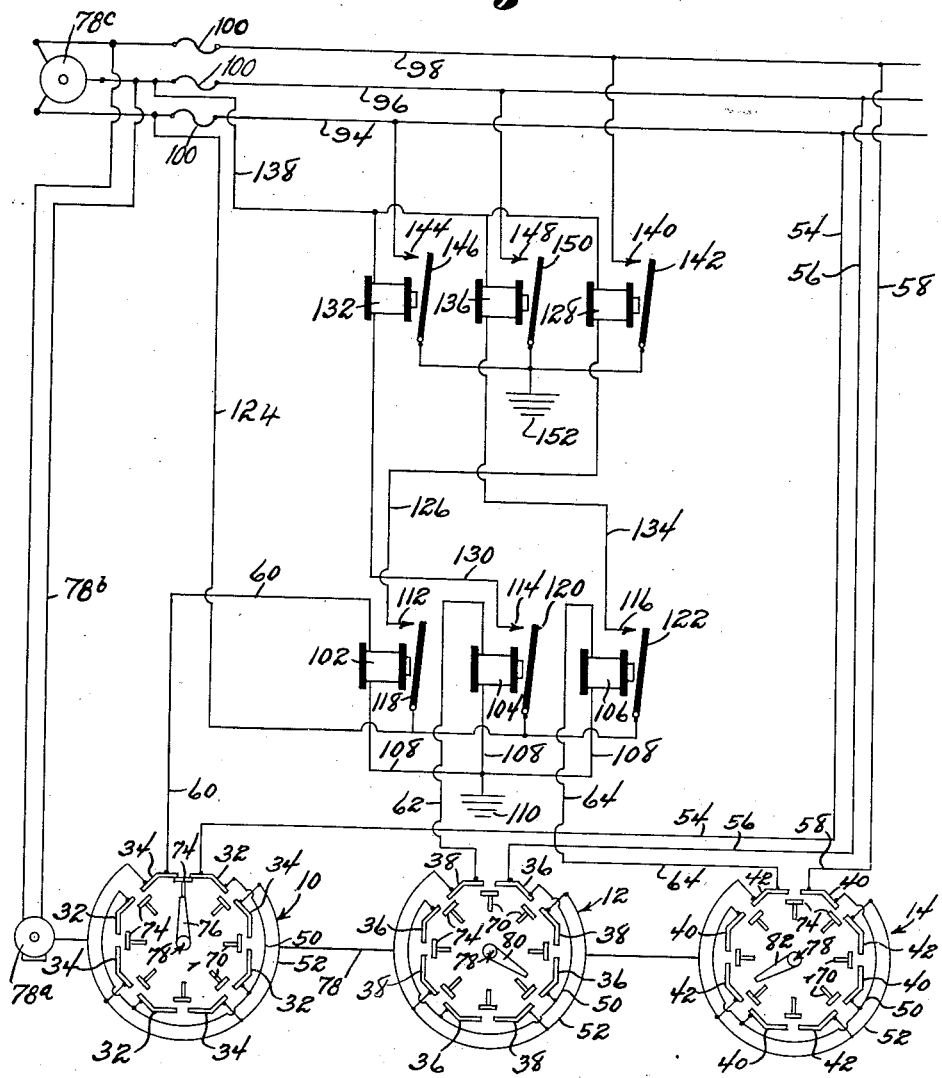
Figure 3 is a diagrammatic view of the circuit.

All the bars 32 are connected in series, as by a wire 50 in Figure 3. Similarly, all the bars 34 are connected in series by a wire 52. In Figure 3, ungrounded live wires 54, 56 and 58 are respectively connected with one bar 32, 36 and 40 in the respective units 10, 12 and 14. Wires 60, 62 and 64 are respectively connected with one contact 34, 38 and 42, respectively in the respective units 10, 12 and 14.

Eight openings 66 are provided in the body 26 for the reception of compression springs 68, each having one end connected with a stem 70 slidable in a bore 72 in the body 26 which stem is provided with a head 74 arranged to electrically bridge one bar 32 with one bar 34 when the stem is moved outwardly relatively to the body 26. All the stems 70 are arranged radially with respect to the axis of the bore 28 and are equally spaced, as well as extending inwardly of the bore to be successively engaged by a cam arm 76 attached to a shaft 78 driven by a motor 78a connected by lines 78b to generator 78c. Normally heads 74 are in their retracted positions, with the springs 68 engaging the body 26 to yieldingly hold the stems and the heads in their retracted positions.

The openings 28 in the units 10, 12 and 14 are coaxial and the shaft 78 extends through all the units. This shaft is provided with cam arms 80 and 82 for coaction with the stems 70 of the units 12 and 14 respectively. As illustrated in Figure 3, the cam arms 76, 80 and 82 are spaced one hundred and twenty degrees apart.

Figure 1 illustrates the shaft 78 as comprising coaxial sections 84 joined by couplings 86 and rotatably supported in bearings 88 having flanges 90 bolted at 92 to the body 26.

In Figure 3, the wires 54, 56 and 58 are respectively connected with line wires 94, 96 and 98, each provided with a fuse 100. The wires 60, 62 and 64 respectively connect with relays 102, 104 and 106, these relays being connected with second wires 108 grounded at 110. Contacts 112, 114 and 116 are respectively associated with the relays 102, 104 and 106, these contacts being respectively engageable by switch elements 118, 120 and 122 respectively controlled by the relays 102, 104 and 106.

A wire 124 leads from the wire 94 to the switch elements 118, 120 and 122. The contact 112 connects with a wire 126 leading to a relay 128, while the contact 114 connects with a wire 130 leading to a relay 132. The third contact 116 connects with a wire 134 leading to a relay 136. All the relays 128, 132 and 136 are connected with a wire 138 lugged to the wire 96.

A contact 140 is associated with the relay 128, engageable by a switch element 142 controlled by that relay, and electrically connected with the wire 98. A contact 144 associated with the relay 132 is connected with the wire 94 and is engageable by a switch element 146 controlled by that relay. Similarly, the contact 148 associated with the relay 136 is connected with the wire 96 and is engageable by a switch element 150 controlled by that relay. All the switch elements 142, 146 and 150 are grounded at 152.

Since the units 10, 12 and 14 are identical in construction and operation, similar reference characters are applied to the corresponding parts in all the units, with the exception of the numerals 36, 38, 40 and 42 and the cam arms 80 and 82.

Rotation of the cam arm 76 successively bridges conductor bars 32 and 34, which periodically electrically connects the wires 54 and 60 to pass current to the relay 102 and to ground 110. Rotation of the cam arm 80 periodically electrically connects the wire 56 with the wire 62 to pass current to the relay 104 and to ground 110. Similarly, rotation of the cam arm 82 periodically electrically connects the wire 58 with the wire 64 to pass current to the relay 106 and to ground 110. This relay system is set in operation only when a ground occurs in any one of the live wires. Because of the spacing of the cam arms 76, 80 and 82 circumferentially of the axis of the shaft 78, the units 10, 12 and 14 are independent in their operations so far as the action of the bridging heads 74 are concerned.

No grounds are permanent at the generator 78c or in the source of supply other than the grounding that takes place through coils 102, 104, and 106, and that is limited by a fixed resistance depending on the system to which applied, and only when the machines in the system are in operation. There are very many different systems in which my invention may be used, as for instance with different voltages, or with alternating current with a generator where the shock preventer is placed at the source of supply. If the alternating current line has a transformer on the line, the shock preventer is placed and connected on the secondary side of the transformer, one for every transformer. If direct current is used the shock preventer is used at the generator. As previously stated the system is ungrounded.

Should a person accidentally come in contact with a live wire, no shock is produced since the system or that particular wire is ungrounded, and an ungrounded system, regardless of voltage, produces no shock. The units 10, 12 and 14 operate to make ground contact at the same rate of frequency as the current flow.

In practice, the apparatus is used at the source of power, as for instance a generator 78c, and all current flows through the aparatus to the homes, shops or the like supplied with current from the generator 78c. The cams 76, 80 and 82 of the apparatus are driven by a synchronous motor, 78a, coupled to the cam carrying shaft 78. The voltage of the line and the frequency determine the speed of the cams 76, 80 and 82, with the result that the units 10, 12 and 14 make ground contact at all times at the rate of frequency of current flow. The units 10, 12 and 14, respectively, make ground contact alternately but there is no current flow through these units to the ground 110 until one of the power lines 94, 96 and 98 becomes grounded. As for example, should power line 94 become grounded in a consumer's home, the unit 12 would in making contact cause current to flow from line 96 through line 56, unit 12, line 62, coil 104 and line 108 to the ground 110. The resulting energization of the relay 104 closes switch 120, with the result that current flows from line 94 through line 24, closed switch 120, line 130, relay 132 and line 138 to line 96. The resulting energization of relay 132 closes switch 146 to connect line 94 to ground 152, with the result that that portion of the line between the apparatus and the consumer's home is closed and will remain closed as long as the ground is maintained. As such portion of the line is closed the grounding of the line by a person will not result in shock to the person. If the ground is caused by metal device there is no possibility of fire. One or more of the fuses 100 will blow when the main supply line is grounded.

Without further elaboration, the foregoing will so fully illustrate my invention, that others may, by applying current knowledge, readily adapt the same for use under various conditions of service.

I claim:

1. In a circuit of the type described, the combination of first, second and third live lines, fuses in said lines; a first group of relatively fixed and spaced contacts connected in series and with said first line; a second group of relatively fixed contacts arranged in alternate relationship with the first group and connected in series; a third group of relatively fixed and spaced contacts connected in series and with said second line; a fourth group of relatively fixed contacts alternately arranged with the third group and connected in series; a fifth group of relatively fixed and spaced contacts connected in series and with said third line; a sixth group of relatively fixed contacts alternately arranged with the fifth group and connected in series; first, second and third relays having a common ground and respectively electrically connected with the said second, fourth and sixth groups of contacts, solenoid switch actuating means; normally open first, second and third switch means respectively actuated by the solenoids of the first, second and third relays and solenoid switch actuating means electrically connected with said first line; fourth, fifth and sixth relays respectively connected with said second, third and first switch means and with said second line; normally open fourth, fifth and sixth switch means actuated by the solenoids and having a common ground and respectively connected with said first, second and third lines; first movable contacts for bridging said first and second groups of contacts; second movable contacts for bridging said third and fourth groups of contacts; third movable contacts for bridging said fifth and sixth groups of contacts; a motor, and means connected with the motor rotating as a unit for successively moving said first, second and third movable contacts into bridging relationship with said first and second, third and fourth, and fifth and sixth groups of contacts, respectively.

2. In a circuit of the type described, the combination of first, second and third live lines; a first group of relatively fixed and spaced contacts connected in series and with said first line; a second group of relatively fixed contacts arranged in alternate relationship with the first group and connected in series; a third group of relatively fixed and spaced contacts connected in series and with said second line; a fourth group of relatively fixed contacts alternately arranged with the third group and connected in series; a fifth group of relatively fixed and spaced contacts connected in series and with said third line; a sixth group of relatively fixed contacts alternately arranged with the fifth group and connected in series; first, second and third relays having a common ground and respectively electrically connected with the said second, fourth and sixth groups of contacts; solenoid switch actuating means normally open first, second and third switch means respectively actuated by the solenoids of the first, second and third relays and solenoid switch actuating means electrically connected with said first line; fourth, fifth and sixth relays respectively connected with said second, third and first switch means and with said second line; normally open fourth, fifth and sixth switch means actuated by the solenoids and having a common ground and respectively connected with said first, second and third lines; first movable contacts for bridging said first and second groups of contacts; second movable contacts for bridging said third and fourth groups of contacts; third movable contacts for bridging said fifth and sixth groups of contacts; a motor, means connected with the motor rotating as a unit for moving said first, second and third movable contacts into successive bridging relationship with said first and second, third and fourth, and fifth and sixth groups of contacts; and fuse means interposed in the respective first, second and third lines.

3. The invention described in claim 1 wherein said means include cam arms offset one hundred and twenty degrees one from the other circumferentially of the axis of rotation of the means.

4. The invention described in claim 2 wherein said means include cam arms offset one hundred and twenty degrees one from the other circumferentially of the axis of rotation of the means.

5. The invention described in claim 1 wherein first, second and third supports are provided for said first and second, third and fourth, and fifth and sixth groups of contacts, respectively; said first, second and third supports each having a central opening with all the openings arranged coaxially one with the other; said first, second and third movable contacts having stems slidably mounted in the first, second and third supports and extending into the respective central openings therein; resilient means acting on the first, second and third movable contacts for holding the same in normally spaced relationship with their respective first and second, third and fourth, and fifth and sixth groups of contacts; said first-mentioned means including first, second and third cam arms rotating as a unit in the central openings of the first, second and third supports, respectively, for successively engaging the stems of the movable contacts; said first, second and third movable contacts being equal in number and arranged in common planes paralleling the axis of rotation of the cam arms, with said cam arms spaced one hundred and twenty degrees apart circumferentially of said axis of rotation.

6. The invention described in claim 2 wherein first, second and third supports are provided for said first and second, third and fourth, and fifth and sixth groups of contacts, respectively; said first, second and third supports each having a central opening with all the openings arranged coaxially one with the other; said first, second and third movable contacts having stems slidably mounted in the first, second and third supports and extending into the respective central openings therein; resilient means acting on the first, second and third movable contacts for holding the same in normally spaced relationship with their respective first and second, third and fourth, and fifth and sixth groups of contacts; said first-mentioned means including first, second and third cam arms rotating as a unit in the central openings of the first, second and third supports, respectively, for successively engaging the stems of the movable contacts; said first, second and third movable contacts being equal in number and arranged in common planes paralleling the axis of rotation of the cam arms, with said cam arms spaced one hundred and twenty degrees apart circumferentially of said axis of rotation.

7. The invention described in claim 1 wherein first, second and third supports are provided for said first and second, third and fourth, and fifth and sixth groups of contacts, respectively; said first, second and third supports each having a central opening with all the openings arranged coaxially one with the other; said first, second and third movable contacts having stems slidably mounted in the first, second and third supports and extending into the respective central openings therein; resilient means acting on the first, second and third movable contacts for holding the same in normally spaced relationship with their respective first and second, third and fourth, and fifth and sixth groups of contacts; said first-mentioned means including first, second and third cam arms rotating as a unit in the central openings of the first, second and third supports, respectively, for successively engaging the stems of the movable contacts; said first, second and third movable contacts being equal in number and arranged in common planes paralleling the axis of rotation of the cam arms, with said cam arms spaced one hundred and twenty degrees apart circumferentially of said axis of rotation, a base for said first, second and third supports; and insulating separators between the base and the respective first, second and third supports.

8. The invention described in claim 2 wherein first, second and third supports are provided for said first and second, third and fourth, and fifth and sixth groups of contacts, respectively; said first, second and third supports each having a central opening with all the openings arranged coaxially one with the other; said first, second and third movable contacts having stems slidably mounted in the first, second and third supports and extending into the respective central openings therein; resilient means acting on the first, second and third movable contacts for holding the same in normally spaced relationship with their respective first and second, third and fourth, and fifth and sixth groups of contacts; said first-mentioned means including first, second and third cam arms rotating as a unit in the central openings of the first, second and third supports, respectively, for successively engaging the stems of the movable contacts; said first, second and third movable contacts being equal in number and arranged in common planes paralleling the axis of rotation of the cam arms, with said cam arms spaced one hundred and twenty degrees apart circumferentially of said axis of rotation, a base for said first, second and third supports; and insulating separators between the base and the respective first, second and third supports.

9. The invention described in claim 1 wherein first, second and third supports are provided for said first and second, third and fourth, and fifth and sixth groups of contacts, respectively; said first, second and third supports each having a central opening with all the openings arranged coaxially one with the other; said first, second and third movable contacts having stems slidably mounted in the first, second and third supports and extending into the respective central openings therein; resilient means acting on the first, second and third movable contacts for holding the same in normally spaced relationship with their respective first and second, third and fourth, and fifth and sixth groups of contacts; said first-mentioned means including first, second and third cam arms rotating as a unit in the central openings of the first, second and third supports, respectively, for successively engaging the stems of the movable contacts; said first, second and third movable contacts being equal in number and arranged in common planes paralleling the axis of rotation of the cam arms, with said cam arms spaced one hundred and twenty degrees apart circumferentially of said axis of rotation; and a motor driven shaft for said cam arms.

10. The invention described in claim 1 wherein said first and second, third and fourth, and fifth and sixth groups of contacts each comprises four in number, and in which there are provided eight each of said first, second and third movable contacts.

PETER A. SOSNOSKIE.